(12) United States Patent
Kinnin et al.

(10) Patent No.: US 11,246,302 B2
(45) Date of Patent: Feb. 15, 2022

(54) BOAT FISHING DEVICES

(71) Applicants: John Kinnin, Fort Myers, FL (US); Chris Cauley, Summerland Key, FL (US); Charles Pohlman, Deerfield Beach, FL (US)

(72) Inventors: John Kinnin, Fort Myers, FL (US); Chris Cauley, Summerland Key, FL (US); Charles Pohlman, Deerfield Beach, FL (US)

(*) Notice: Subject to any disclaimer, the term of this patent is extended or adjusted under 35 U.S.C. 154(b) by 292 days.

(21) Appl. No.: 16/528,036

(22) Filed: Jul. 31, 2019

(65) Prior Publication Data

US 2020/0037593 A1 Feb. 6, 2020

Related U.S. Application Data

(60) Provisional application No. 62/714,975, filed on Aug. 6, 2018.

(51) Int. Cl.
| | |
|---|---|
| *A01K 91/14* | (2006.01) |
| *A01K 97/10* | (2006.01) |
| *A01K 87/02* | (2006.01) |
| *B63B 35/14* | (2006.01) |

(52) U.S. Cl.
CPC ............. *A01K 91/14* (2013.01); *A01K 87/02* (2013.01); *A01K 97/10* (2013.01); *B63B 35/14* (2013.01)

(58) Field of Classification Search
CPC .......... A01K 97/06; A01K 97/16; A01K 91/14
See application file for complete search history.

(56) References Cited

U.S. PATENT DOCUMENTS

| 4,884,357 A * | 12/1989 | Clifford | A01K 97/06 43/25.2 |
|---|---|---|---|
| 7,191,559 B1 * | 3/2007 | Laceky | A01K 87/06 43/21.2 |
| 9,497,951 B1 * | 11/2016 | Stefanko | A01K 97/06 |
| 2005/0091906 A1 * | 5/2005 | D'Alusio | A01K 97/06 43/25.2 |
| 2016/0037760 A1 * | 2/2016 | Melvin | A01K 97/06 43/25.2 |
| 2016/0135442 A1 * | 5/2016 | Saunders | A01K 99/00 43/25.2 |
| 2020/0359614 A1 * | 11/2020 | Mcniel | A01K 97/06 |

* cited by examiner

*Primary Examiner* — Richard G Davis
(74) *Attorney, Agent, or Firm* — Dunlap Bennett & Ludwig, PLLC

(57) ABSTRACT

A fishing system for fishing in a center console or smaller fishing boat in the big or rough seas is provided. The fishing system may include a teaser rigger mounted to the fishing boat, wherein a teaser release line is received through at least two pulleys and operatively associating a teaser to a boom. The fishing system may separately or in combination include a leader saver connected to a fishing rod in the fishing boat. The fishing system may separately or in combination include a non-skid material of fighting chair frictionally engaging a flat surface provided in the fishing boat.

3 Claims, 6 Drawing Sheets

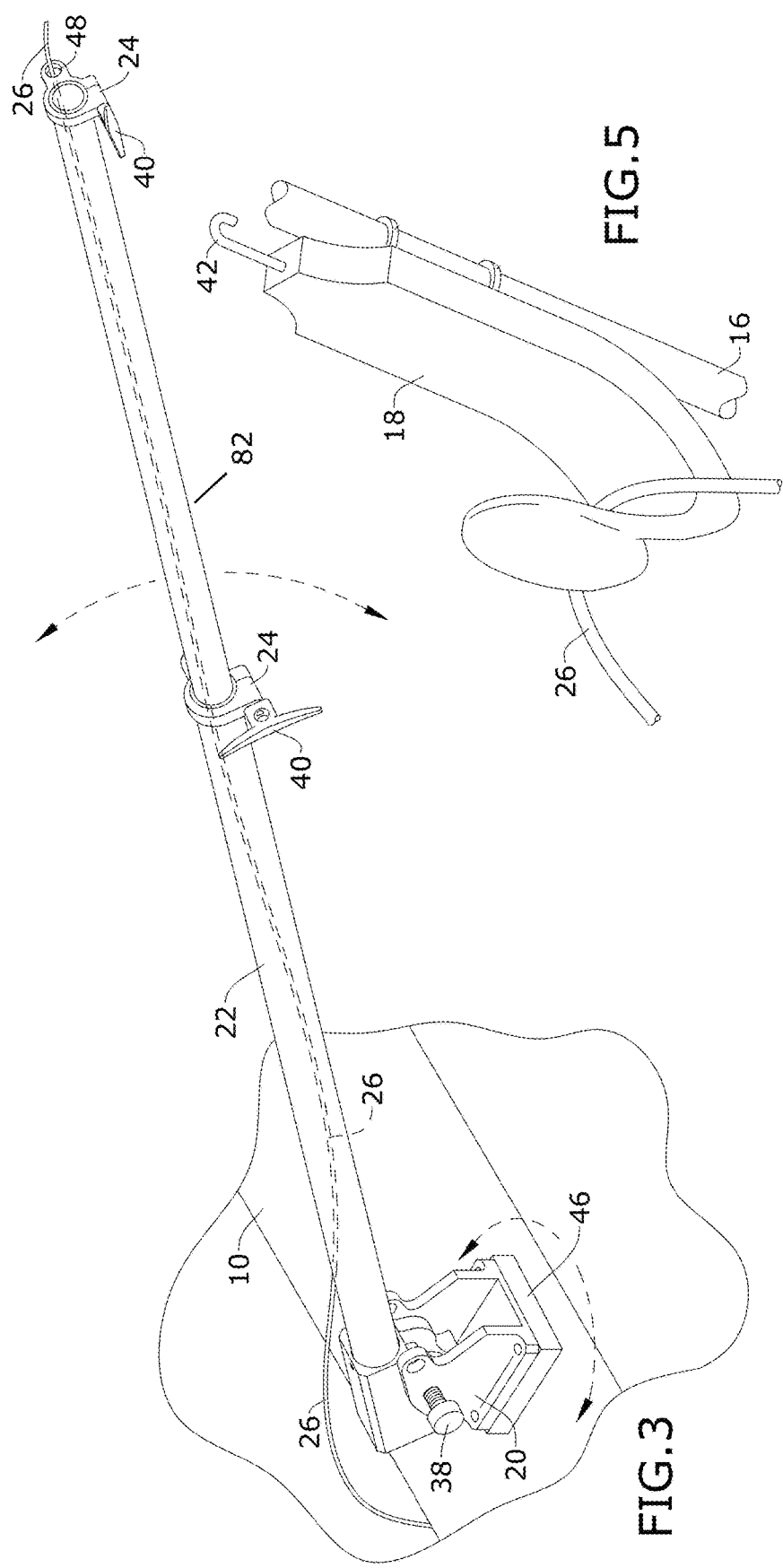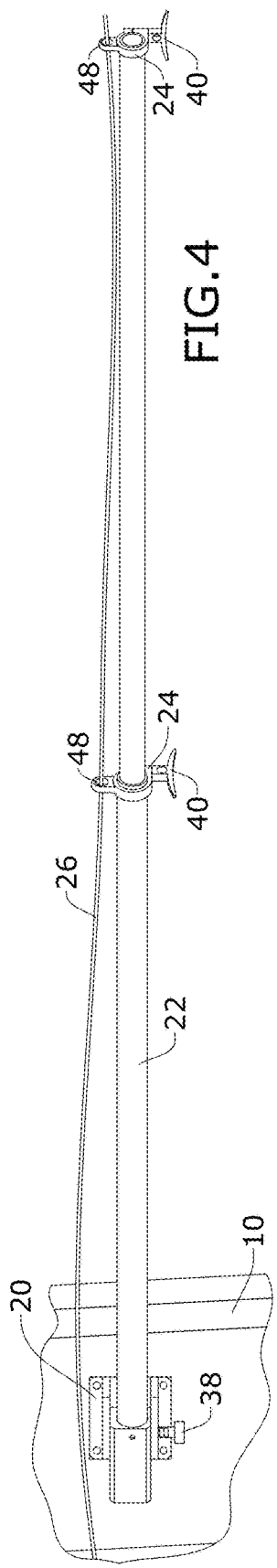

BOAT FISHING DEVICES

CROSS-REFERENCE TO RELATED APPLICATION

This application claims the benefit of priority of U.S. provisional application No. 62/714,975, filed 6 Aug. 2018, the contents of which are herein incorporated by reference.

BACKGROUND OF THE INVENTION

The present invention relates to fishing equipment and, more particularly, to a teaser rigger, a leader saver, and a fighting board.

It is not easy to deploy teasers on a smaller or center console fishing boat because most teaser rigging devices are made for larger fishing boats. As a result, current teasers riggings are too large for smaller boats and so with or without current teaser riggings the teaser cannot be easily deployed to the optimum distance outside the boat prop wash. Another consequence of being without teaser rigging is that the teasers are not easily retrievable.

Additionally, many boat fishermen have struggled with properly securing longer leaders to their rods and reels, whether it is a trolling rig, a longer leader for tackle shy fish, employing a dipsy or jet diver or a plain old grouper rig. As a result, long leaders or fishing line may become compromised and break, and so dependent equipment such as sinkers, dipsy or jets may fly off and break. Currently, compromised lines are either cut off and retied later or wound about the equipment and so are unsecured at the top of the fishing rod. By cutting off your line, however, you waste time and money. And, as just mentioned, when compromised from wear and tear of unsecured equipment, the line can break causing the equipment to come loose, be broken, lost or become a safety concern as it flies off the line.

Furthermore, when boat fishing and fighting big fish, especially in the big or rough seas, a stand-up fighting harness can jeopardize the fisherman's safety. Current seated harness solutions, unfortunately, are geared for one specific platform or seat, and so they are not completely universal and portable.

As can be seen, there is a need for a teaser rigger embodying a teaser/dredge boom, the ability to adjust the boom in both horizontal and vertical planes and pulleys that can be adjusted to any position along the boom thereby enabling the teasers to be launched and deployed outside the prop wash, retrieved and stowed by one person on a small or center console fishing boat. For instance, the teaser rigger may be selectively moved to one of the many positions offered by the versatility of our swivel base (horizontal plane) and pivot plate (vertical plane).

Separately, there is also a need for a leader saver dimensioned and adapted to provide a simple and safe form of securing and protecting long leaders thereby minimizing tangles and line frays. The leader saver embodied in the present invention enables users to properly secure and save long lines or leaders by securing them at two fixed adjustable points. Long lines and leaders can be wound around the flange hook of the leader saver and the reel or reel seat and be secured by the bungee cord, keeping the line and equipment secure for future use.

Additionally, it is also evident that there is also a need for a fighting board adapted for putting a boat fisherman in a seated position, wherein the fighting board is portable and will operatively associate with any size base or platform, turning nearly any flat surface, like a cooler top, into a secure seat to reel in a fish. The fighting board embodied in the present invention is simpler and universal than the prior art, providing more flexibility then currently offered.

SUMMARY OF THE INVENTION

In one aspect of the present invention, a leader saver includes a body; a wire embedded in the body and protruding upwardly therefrom, the wire forming a hook shape; and an arcuate flange portion extending from a lower portion of the body, wherein the flange portion curves toward an upper portion of the body, wherein the flange portion is coated in a non-abrasive material.

In another aspect of the present invention, a method of securing and protecting long leaders by minimizing tangles and line frays includes the following: securing the above-mentioned leader saver to an upper support guide on a fishing rod by way of the hook shape; positioning equipment connected to the leader line at the base of the fishing rod above the reel; and wrapping the leader line around the reel and the flange portion drawing tight with a bungee cord to prevent sway.

In yet another aspect of the present invention, a fighting chair includes the following: a platform having an upper side and an opposing lower side; non-skid material attached along the lower side; and a pivot gimbal attached along a periphery of the platform.

In yet another aspect of the present invention, a teaser rigger includes the following: an elongated tube having an approximate length between six and ten feet; at least two pulleys connected along the length, wherein a distal pulley is attached to a distal end of the tube and the other somewhere between the distal end and the proximal end of the tube, depending on the current application, the proximal end attached to a pivotable base wherein the tube is movable between a deployment condition and a stowing condition and a variety of positions in between, wherein each pulley is associated with an eye ring, which is a component of a toolless adjustable cleat, for selectively positioning each pulley along the tube; a guide pin on a pivotable base allows for rotation of the entire assembly in a horizontal plane; and a guide pin operatively associated with the pivotable base will lock the tube in a plurality of fixed vertical positions, and wherein a teaser line is receivable through the two pulleys and operatively associating a teaser to the tube.

These and other features, aspects and advantages of the present invention will become better understood with reference to the following drawings, description and claims.

BRIEF DESCRIPTION OF THE DRAWINGS

FIG. 3 is a perspective view of an exemplary embodiment of a teaser rigger of the present invention;

FIG. 4 is a top plan view of an exemplary embodiment of the teaser rigging of the present invention;

FIG. 5 is a perspective view of an exemplary embodiment of a leader saver of the present invention shown in use;

DETAILED DESCRIPTION OF THE INVENTION

Figure 1:
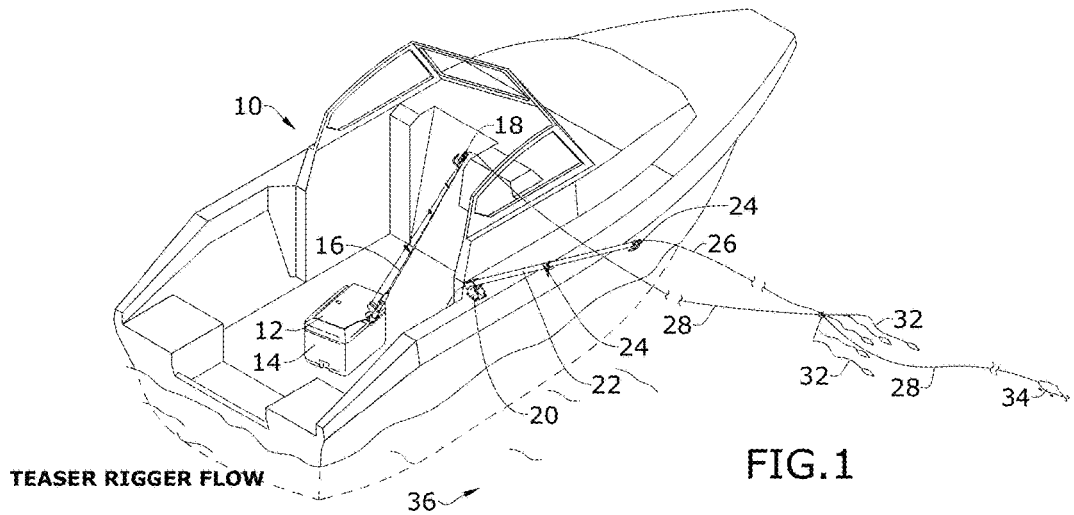
FIG. 1 is a perspective view of an exemplary embodiment of the present invention shown in use.
Figure 2:
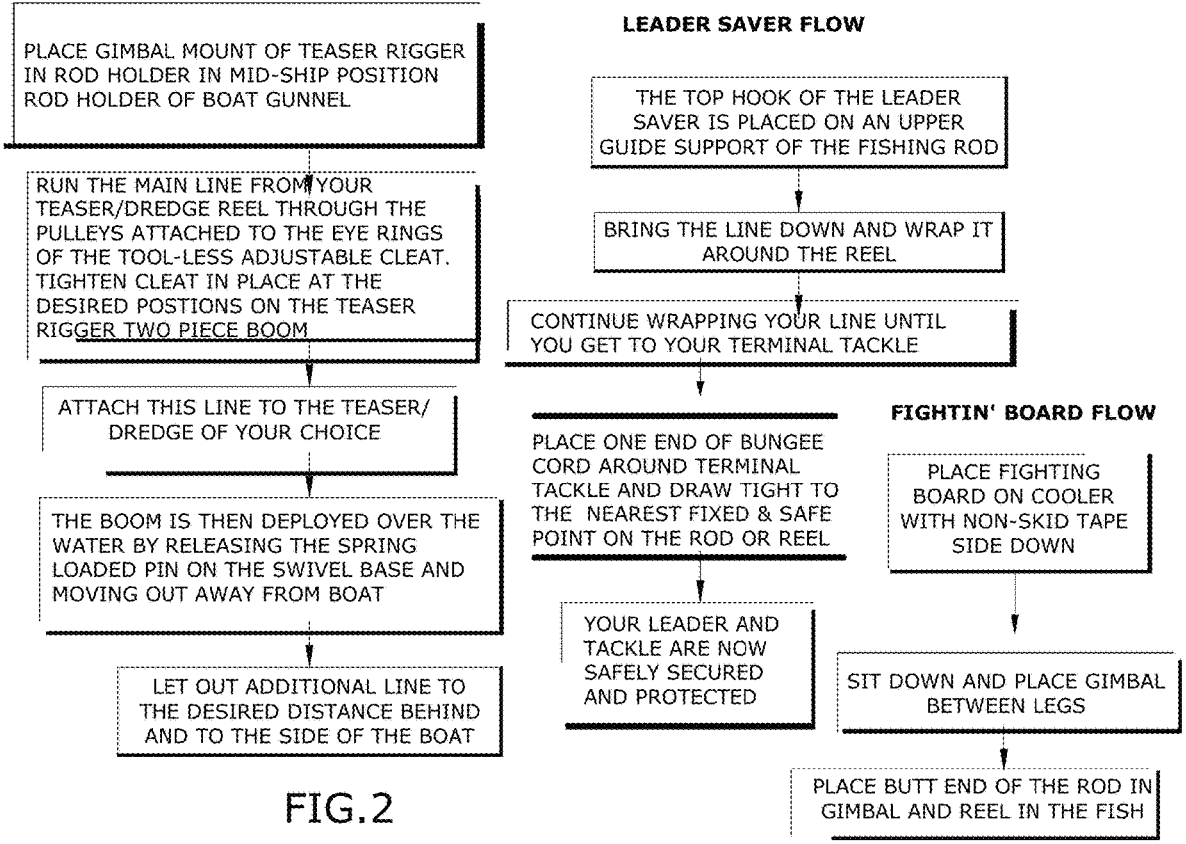
FIG. 2 is a flow chart of an exemplary embodiment of the present invention.
Figure 6:
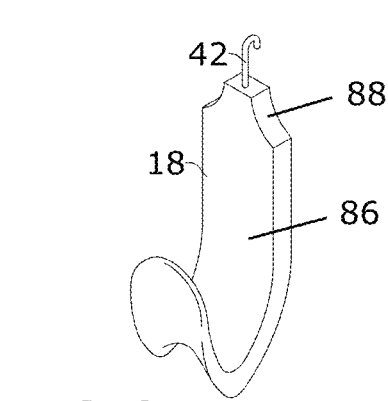
FIG. 6 is a perspective view of an exemplary embodiment of the leader saver of the present invention.
Figure 8:
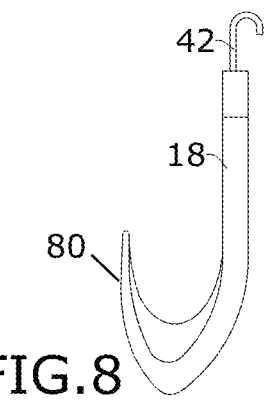
FIG. 8 is a side elevation view of an exemplary embodiment of the leader saver of the present invention.
Figure 7:
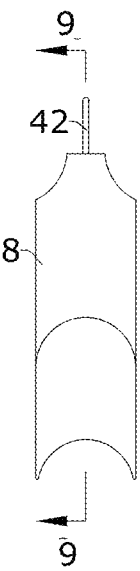
FIG. 7 is a front elevation view of an exemplary embodiment of the leader saver of the present invention.
Figure 9:
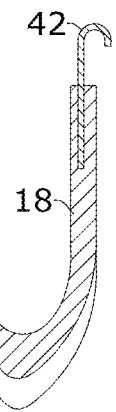
FIG. 9 is a section elevation view of an exemplary embodiment of the leader saver of the present invention, taken along line 9-9 of FIG. 7.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Referring to FIGS. 1 through 17, the present invention may include a fighting board 100, a leader saver 18, and/or teaser rigger 22. It should be understood by those skilled in the art that the use of directional terms such as upper, lower, upward, downwardly, top and the like are used in relation to the illustrative embodiments as they are depicted in the figures, the upward direction (or upper) being toward the top of the corresponding figures and a downward (lower) direction being toward the bottom of the corresponding figures.

Teaser Rigging

Referring now to FIGS. 1 through 4, the present invention may include a teaser rigger 22 having one or more elongated cylindrical booms or tubes 82, one or more clamp guides 24, one-or more adjustable cleats 40, and a molded pivotable base 20 with a spring-loaded guide pin 38. The pivotable base 20 may be mounted to a swivel base 46 that is further mounted to a reinforced rod gimbal mount 55, the teaser rigger 22 may be placed in a fixed rod holder on the boat 10 so that the teaser rigger 22 rotates relative to the gunwale, allowing the one or more elongated cylindrical tubes 82 to be moved between a position out over the water, a forward or aft forty-five degree position and a position over the boat 10 either forward or aft.

The one or more elongated cylindrical tubes 82 may be made of metallic or other suitably strong and rust resistant materials. In certain embodiments, the one or more elongated cylindrical tubes 82 may be approximately eight feet in length, for example between seven and nine feet in length. In other embodiments, the length of the elongated cylindrical tube 82 may be custom ordered to any desired length that the balance of the unit can comfortably accommodate.

The clamp guides 24 may be attached along the cylinder tube 82, typically at the end and middle thereof, wherein a toolless adjustable cleat 40 selectively secures each clamp guide 24 to the cylinder tube 82. Each clamp guide 24 provides an eye ring 48 at which points pulleys 25 are connected. The teaser line 26 will run from a teaser reel of choice through both pulleys 25, typically from mid to distal, and then be connected to a teaser/dredge of choice and is ready for deployment. In cases where an A-Frame system is used the mid pulley 25 will be removed from the eye ring 48, placed in line on the teaser line 26 and the terminal swivel on the teaser line 26 will be clipped to the mid eye ring 48. The teaser rigger system embodied in the present invention can be deployed or retrieved by one person by way of the swivel base 46 and the pivotable base 20, while the alignment of the clamps guides 24 and eye rings 48 along the cylindrical tube(s) 82 facilitates this. It should be understood that the pivotable base 20, the clamp guides 24, and the swivel base 46 may be either individually secured as separable components or in some embodiments, they may be integrated to be cooperatively secured. The alignment of guide pins 38 for movement of the cylindrical tube(s) 82 enables selective positioning the teaser rigger 22 and thus the operatively associated teaser 32.

A method of using the present invention may include the following. The teaser rigger 22 disclosed above may be provided. A user may place the gimbal mount 55, see FIG. 16, in a rod holder on a fishing boat 10. The user may run the teaser line 26 from their dredge or teaser reel through the pulleys 25 attached to the eye hooks 48, and then connect the teaser line 26 to the desired teaser/dredge 32. The cylindrical tube 82 may be deployed over the water by releasing the spring-loaded pin 45 on the swivel base 46, see FIG. 15, and moving out and away from the boat. The cylindrical tube 82 may also be moved in a vertical plane by releasing the guide pin 38 on the pivotable plate 20 and locking it into the desired position. The user may then let out more line to a desired distance behind and to the side of the boat 10. To retrieve, one pulls in the teaser line 26 and raises the teaser 32 out of the water 36 and out of the way to one of the desired positions allowed by adjusting the swivel base 46 and the pivotable plate 20. It should be understood that though FIG. 1 shows the teaser line 26 coming off the side of the boat 10, that the teaser line 26 more likely than not would be deployed off the aft of the boat 10, as described above.

Leader Saver

Referring now to FIGS. 5 through 9, the present invention may include a leader saver 18 dimensioned and adapted to provide a simple and safe form of securing and protecting long leaders thereby minimizing tangles and line frays.

The leader saver 18 provides a bendable wire of preselected specifications that fit into a body portion 86 and extends out a top portion 88 thereof to form a hook 42. The mold of the body portion 86 may have two pieces that are adhered together with the wire 42 in the center and extending outward as the hook 42. In one embodiment, the wire 42 may be inserted between the two pieces of the body portion 86 and the two pieces are then adhered together to form the one-piece body portion 86. The lower portion of the body portion 86 may form a flange hook 80. The flange hook 80 on the leader saver 18 could be coated in plastic to be non-abrasive. The flange hook 80 allows the leader/fishing line 28 to be wrapped around the flange hook 80, securing the leader/fishing line 28 at a mid-point of the rod 16 while the leader/fishing line 28 also wraps around the reel or reel seat at the bottom of the rod 16, as explained in FIG. 2.

A method of using the present invention may include the following. The leader saver 18 disclosed above may be provided. After attaching the leader saver 18 to the bridge of an eye-lit near the mid-point of a fishing rod 16 via the hook wire. The user may place the heavier equipment, i.e. the sinker, dipsy diver, etc., at the bottom, by the reel. In any event, the equipment that is connected to the leader or fishing line 28 should be positioned at the base of the rod 16 above the reel.

Figure 13:
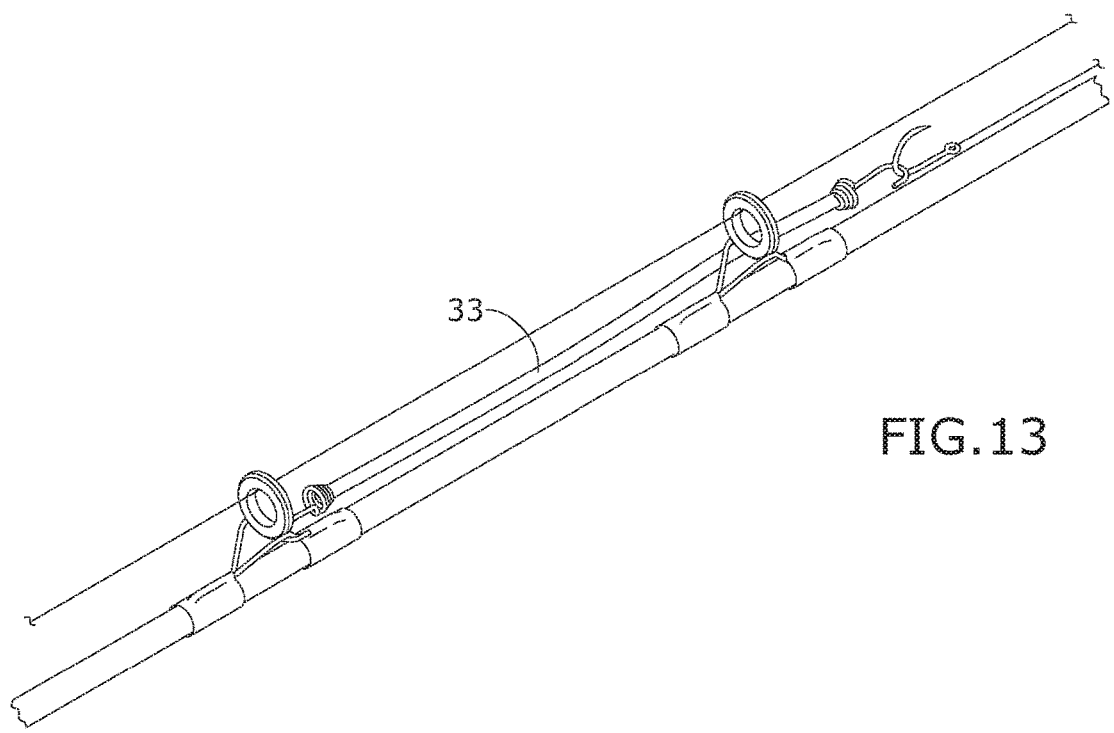
FIG. 13 is a side elevation view of an exemplary embodiment of the leader saver of the present invention, shown in use along with a bungee cord 33.
Figure 14:
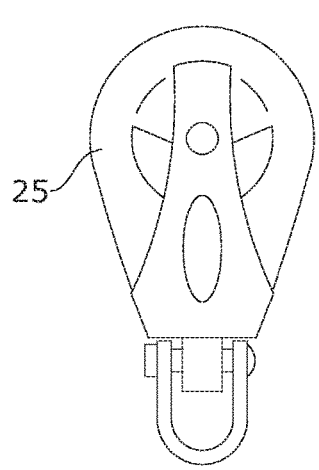
FIG. 14 is a side elevation view of an exemplary embodiment of a pulley 25 of the present invention.
Figure 15:
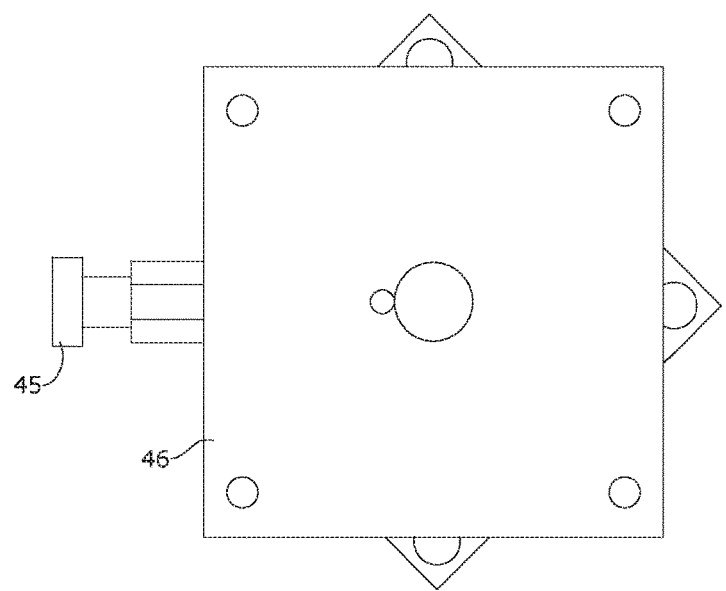
FIG. 15 is a top plan view of an exemplary embodiment of a swivel base 46 providing a spring-loaded pin 45 of the present invention.
Figure 16:
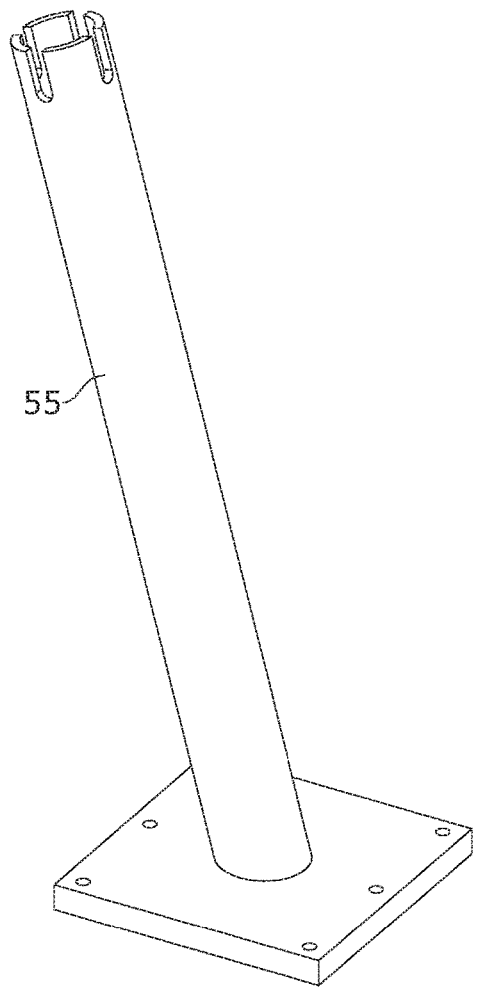
FIG. 16 is a perspective view of an exemplary embodiment of a reinforced gimbal 55 of the present invention.
Figure 17:
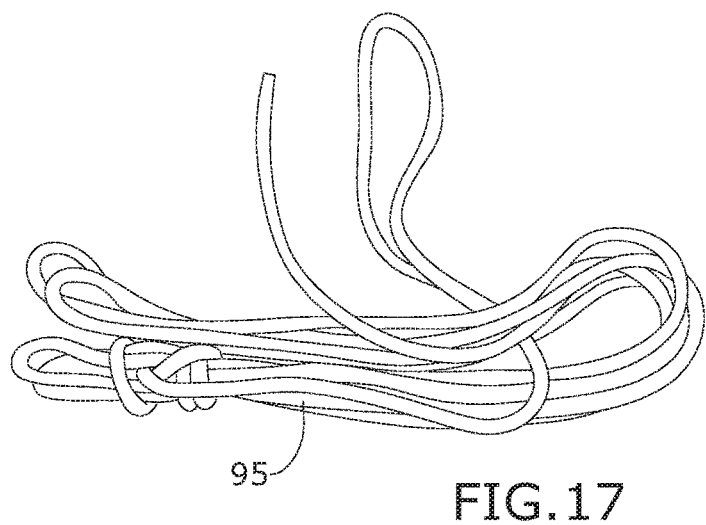
FIG. 17 is an elevation view of an exemplary embodiment of a safety line 95 of the present invention.

The user may wind the fishing line 28 around one's reel or reel seat, at the bottom, and the leader saver 18 at the top, continuing to wind the line in this fashion until the terminal tackle is reached, connecting one end of the bungee cord 33 to the terminal tackle and the other to the nearest fixed, and safe, point on the rod or reel thereby keeping equipment secure while protecting your leader or fishing line 28 and minimizing line fray or breakage. For example the user may wrap around the reel or reel seat and the leader saver 18, until the terminal tackle is reached at which point one end of the bungee cord 33 is attached to the terminal tackle and the other end is drawn tight to the nearest fixed and safe position of the rod 16 or the reel to prevent sway, as illustrated in FIG. 13. Thereby, the leader saver 18 keeps the line intact and the equipment secure at the bottom of the fishing rod.

Subsequent use, the user may drop their equipment to the base of the rod 16, just above the reel, before wrapping their leader around the reel, and then the user may draw the line tight and stow away until your next use.

Fighting Board

Figure 10:
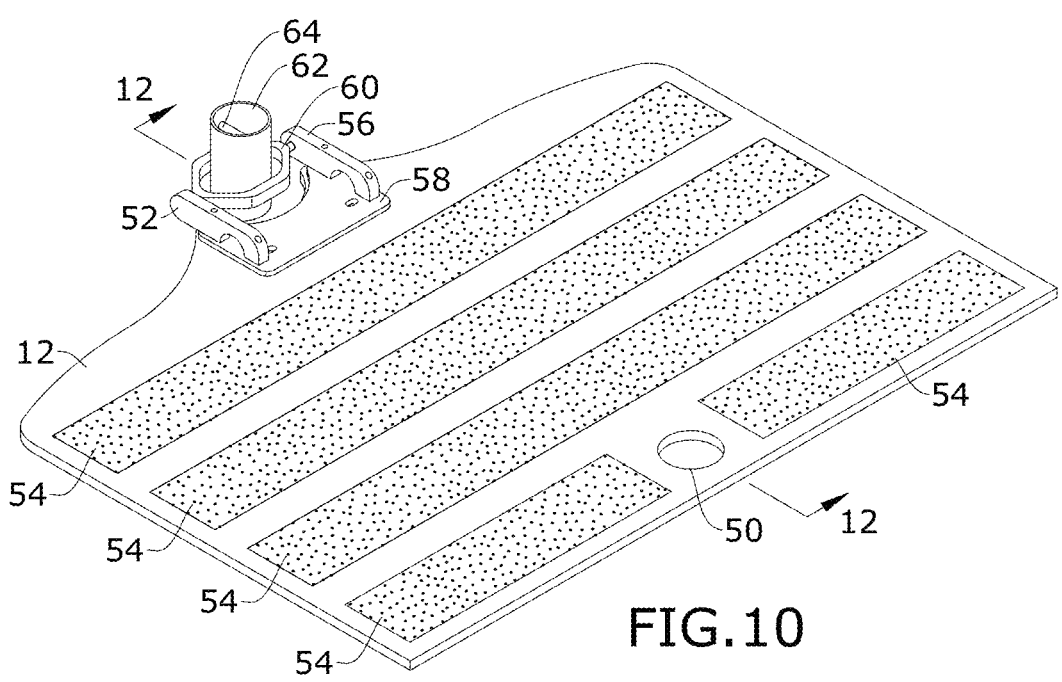
FIG. 10 is a perspective view of an exemplary embodiment of a fighting board of the present invention.
Figure 11:
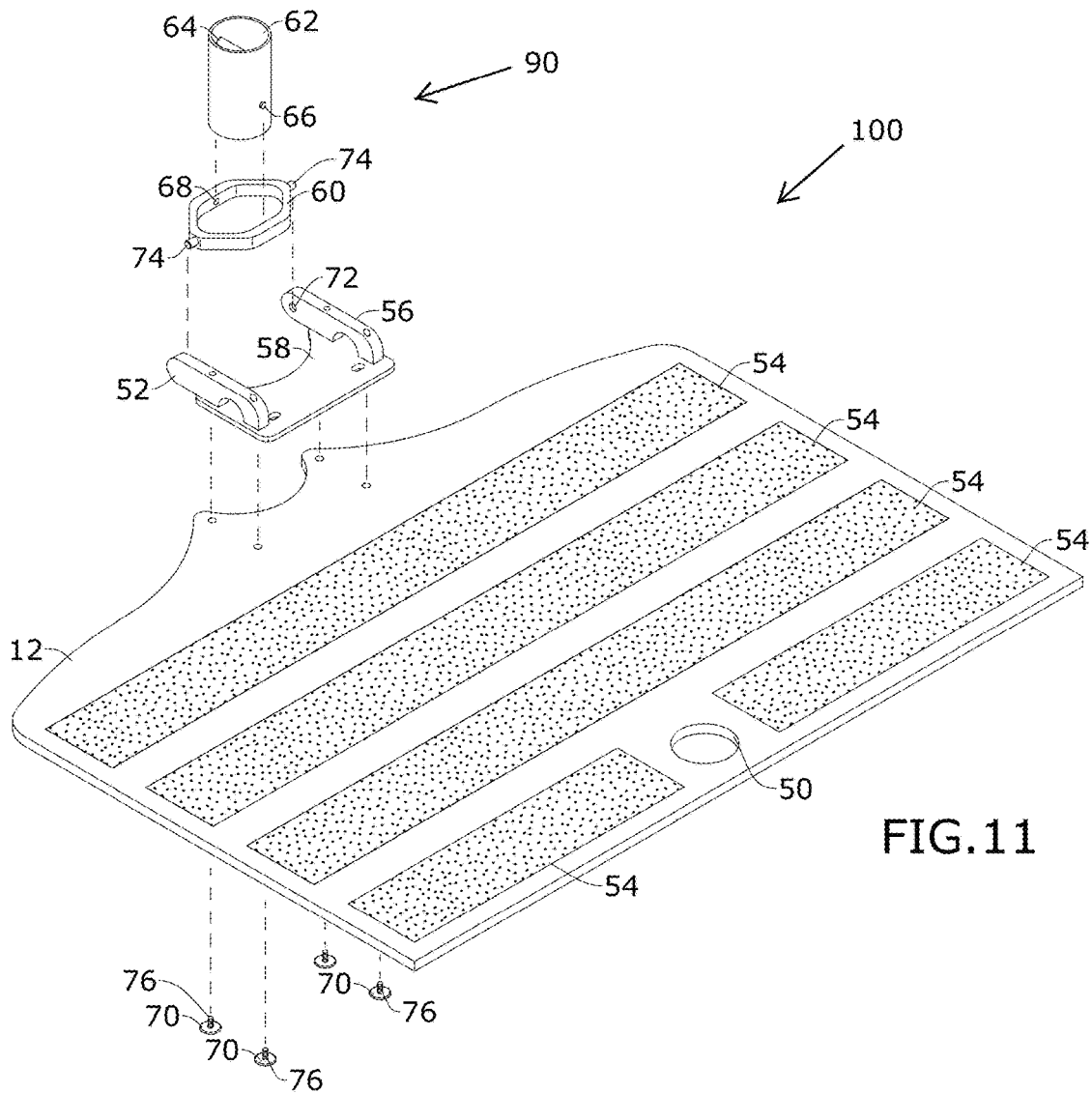
FIG. 11 is an exploded perspective view of an exemplary embodiment of the fighting board the present invention.
Figure 12:
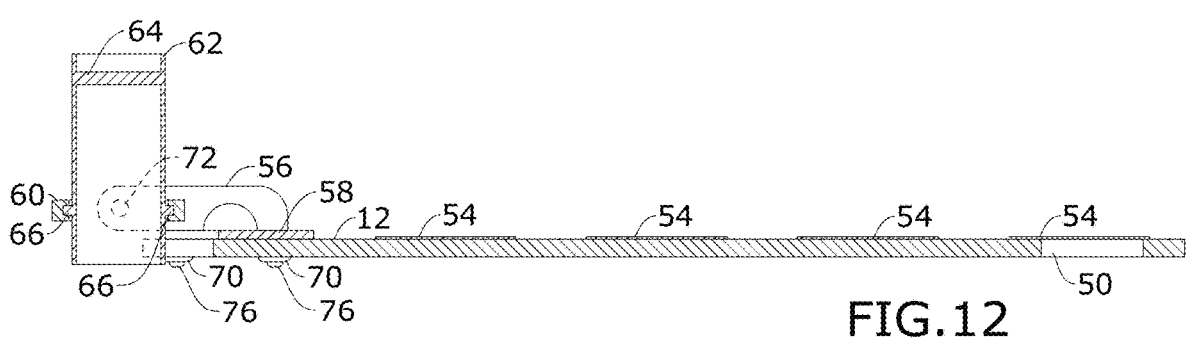
FIG. 12 is a section elevation view of an exemplary embodiment of the fighting board of the present invention, taken along line 12-12 of FIG. 10.

Referring now to FIGS. 10 through 12, the present invention may include a fighting board 100 adapted for allowing a boat fisherman to take a seated position on a suitably sized flat surface to reel in a fish. The fighting board 100 may include an approximately ½" marine grade starboard platform 12 cut to specifications, dimensioned and adapted to accommodate a seated human user. The fighting board platform 12 can be cut to different sizes and shapes not illustrated in the Figures, as long as the invention works as disclosed herein. The platform 12 may provide a carrying handle 50.

A stainless-steel gimbal 90 is mounted to the underside of the platform 12 with sufficient fasteners 76, such as four stainless steel threaded flush mounted screws. The gimbal 90 may also include support arms 52 and 56 along a support plate 58 that engages an upper side of the platform 12. The gimbal 90 may include a fishing pole 16 support shaft 62, wherein the support shaft 62 has a supporting opening that associates with a support pin 64 for connecting the support shaft 62 to a support brace 60 via a brace pin receiver 68. The support brace 60 may provide brace pins 74 dimensioned and adapted to engage pin openings 72 in said support arms 52 and 56.

The underside of the board 12 has strips of non-skid tape 54 to counteract sliding. The gimbal 90 is rotatably attached to the platform 12. The gimbal 90 is disposed along a periphery of the platform 12 so as to be positioned between the legs of a user seated on the platform 12 for reeling in a fish. The non-skid tape 54 on the underside keeps the fighting board 100 positioned correctly.

A method of using the present invention may include the following. The fighting board 100 disclosed above may be provided. While sitting, the rod 16 may be locked in place with the gimbal 90 which is between a user's legs sitting on the platform 12 that has the non-skid tape 54 on the underside for frictionally engaging a supporting surface. The butt end of the fishing rod 16 may be placed into the gimbal 90. The gimbal 90 allows the user to anchor the fishing rod 16. In certain embodiments, the user places the fighting board 100 on a cooler 14, seat or supporting surface of the user's choice; sits down for safety and place the butt end of the fishing rod 16 into the gimbal 90; and reels in the fish with the rod securely anchored in place.

Though the fighting board 100, the leader saver 18, teaser rigger 22 may be separable and used independently of each other, they may also may be used in conjunction, as illustrated in FIG. 1.

It should be understood, of course, that the foregoing relates to exemplary embodiments of the invention and that modifications may be made without departing from the spirit and scope of the invention as set forth in the following claims.

What is claimed is:

1. A leader saver comprising,
a body;
   a wire embedded in the body and protruding upwardly therefrom, the wire forming a hook shape; and
an arcuate flange portion extending from a lower portion of the body, wherein the flange portion curves toward an upper portion of the body.

2. The leader saver of claim 1, wherein the flange portion is coated in a non-abrasive material.

3. A method of securing and protecting long leaders thereby minimizing tangles and line frays, comprising:
securing the leader saver of claim 1 to a midway support guide on a fishing rod by way of the hook shape;
positioning equipment connected to the leader line at the base of the fishing rod above the reel;
wrapping the leader line around the reel or reel seat and the flange portion; and
drawing tight the leader line by attaching a bungee cord to the terminal tackle of the leader line and by attaching the other end of the bungee cord to an adjacent fixed and safe point on the fishing rod or reel to prevent sway.

\* \* \* \* \*